(12) United States Patent
Gutmann

(10) Patent No.: US 9,683,645 B2
(45) Date of Patent: Jun. 20, 2017

(54) DIFFERENTIAL OF LIGHTWEIGHT CONSTRUCTION FOR MOTOR VEHICLES

(75) Inventor: Peter Gutmann, München (DE)

(73) Assignee: SONA BLW PRAZISIONSSCHMIEDE GMBH, Munich (DE)

( * ) Notice: Subject to any disclaimer, the term of this patent is extended or adjusted under 35 U.S.C. 154(b) by 1441 days.

(21) Appl. No.: 12/599,049

(22) PCT Filed: Jan. 25, 2008

(86) PCT No.: PCT/EP2008/000573
§ 371 (c)(1),
(2), (4) Date: Dec. 23, 2009

(87) PCT Pub. No.: WO2008/135102
PCT Pub. Date: Nov. 13, 2008

(65) Prior Publication Data
US 2010/0130325 A1    May 27, 2010

(30) Foreign Application Priority Data
May 8, 2007  (DE) .................. 10 2007 021 437

(51) Int. Cl.
*F16H 48/08* (2006.01)
*F16H 48/40* (2012.01)

(52) U.S. Cl.
CPC ............. *F16H 48/08* (2013.01); *F16H 48/40* (2013.01); *F16H 2048/085* (2013.01); *F16H 2048/405* (2013.01)

(58) Field of Classification Search
USPC ..... 74/83, 92, 144, 464, 606 R, 607, 606 A; 475/230; 29/893.1
See application file for complete search history.

(56) References Cited

U.S. PATENT DOCUMENTS 3,712,692 A * 1/1973 Restelli .................. 384/579
4,089,570 A * 5/1978 Markfelder et al. ........ 384/510
(Continued)

FOREIGN PATENT DOCUMENTS

DE      462127 C    7/1928
DE    1810520 A1    6/1970
(Continued)

OTHER PUBLICATIONS

International Search Report dated May 20, 2008 from the corresponding PCT/EP2008/000573.
(Continued)

*Primary Examiner* — William Kelleher
(74) *Attorney, Agent, or Firm* — Katten Muchin Rosenman LLP

(57) ABSTRACT

The invention relates to a differential of lightweight construction for motor vehicles having a differential housing made of two sheet metal shells, in which differential bevel gears are supported on carrier studs fixed to the housing and mesh with axle bevel gears, and wherein a carrier shell having a drive gear attached to the exterior circumference thereof and a cover shell are joined along a common joining plane to form the differential housing, one or more carrier each having at least one end mounted in and attached to holes in the housing, which are each formed half in the carrier shell and the cover shell. Both sheet metal shells are encompassed by one or more circumferential rings adjacent to the connecting plane thereof for reinforcement.

16 Claims, 11 Drawing Sheets

(56) References Cited

U.S. PATENT DOCUMENTS

| | | | |
|---|---|---|---|
| 4,252,386 A * | 2/1981 | Hofmann et al. | 384/510 |
| 4,815,748 A * | 3/1989 | Schubert | 277/422 |
| 4,825,981 A * | 5/1989 | Otto et al. | 188/218 XL |
| 5,370,401 A * | 12/1994 | Sandgren | 277/306 |
| 5,415,599 A * | 5/1995 | Cilano | 475/252 |
| 5,493,862 A * | 2/1996 | Folsom | 60/404 |
| 6,061,907 A * | 5/2000 | Victoria et al. | 29/893.1 |
| 6,325,180 B1 * | 12/2001 | De Vries et al. | 188/72.1 |
| 6,699,154 B2 * | 3/2004 | Orr et al. | 475/230 |
| 6,745,638 B1 * | 6/2004 | Godtner | 74/55 |
| 6,793,057 B1 * | 9/2004 | Smith, Jr. | 192/70.14 |
| 6,935,470 B1 * | 8/2005 | Smith, Jr. | 188/218 XL |
| 7,081,065 B2 * | 7/2006 | Sudou | 475/230 |
| 7,217,217 B2 * | 5/2007 | Santelli | 475/230 |
| 7,244,211 B2 * | 7/2007 | Bostbarge | 475/230 |
| 7,306,537 B2 * | 12/2007 | Nakajima | 475/230 |
| 7,320,659 B2 * | 1/2008 | Pritchard et al. | 475/331 |
| 7,591,751 B2 * | 9/2009 | Sudorowski et al. | 475/230 |
| 7,669,330 B1 * | 3/2010 | McGean | 29/893.2 |
| 7,721,409 B2 * | 5/2010 | Lindsay et al. | 29/557 |
| 7,819,040 B2 * | 10/2010 | Meier et al. | 74/607 |
| 2002/0174740 A1 * | 11/2002 | Bell | 74/606 R |
| 2005/0049104 A1 * | 3/2005 | Atkinson et al. | 475/230 |
| 2006/0276296 A1 * | 12/2006 | Rosochacki et al. | 475/220 |
| 2007/0093348 A1 * | 4/2007 | Demirdogen et al. | 475/230 |
| 2010/0130325 A1 * | 5/2010 | Gutmann | 475/230 |
| 2010/0284643 A1 * | 11/2010 | Nuissl et al. | 384/577 |

FOREIGN PATENT DOCUMENTS

| | | |
|---|---|---|
| DE | 19546331 C1 | 12/1996 |
| DE | 10022611 A1 | 11/2001 |
| DE | 10059684 A1 | 6/2002 |
| EP | 0979959 B | 5/2002 |

OTHER PUBLICATIONS

Written Decision of the International Search Authority from the corresponding PCT/EP2008/000573.

* cited by examiner

DIFFERENTIAL OF LIGHTWEIGHT CONSTRUCTION FOR MOTOR VEHICLES

BACKGROUND OF THE INVENTION

1. Field of the Invention

The invention relates to a differential of lightweight construction for motor vehicles having a differential housing made of two sheet metal shells, in which differential bevel gears are supported on driving pins fixed to the housing and mesh with axle bevel gears, and wherein a carrier shell having a drive gear fastened to the outer circumference thereof and a cover shell are fitted together along a common joint plane to form the differential housing.

2. Description of Related Art

In EP 0979959 B1 there is described a method for manufacturing motor vehicle differential mechanisms, wherein the differential housing is made of two housing parts, which are manufactured by cold forming from cut-to-size sheet metal sections and are subjected to mechanical finish machining before being permanently joined by welding.

For the purpose of drive transmission, a toothed gear disk is fastened to the outside of one of the housing parts. Both housing parts comprise bearing hubs for attaching the wheel axles; the bearing hubs are precision-machined at their circumference to receive axial ball bearings.

In the known differential housing, the two housing parts have relatively large wall thickness and a diameter that is further increased by the fact that two housing shells engage one in the other in the joint region. Because the driving pins are supported in the inner housing shell alone, the wall thickness thereof is considerable in order to ensure a sufficient seating face for the ends of the driving pin.

In contrast, the object of the present invention is to provide a differential of the type mentioned hereinabove, wherein the differential housing is particularly thin-walled and thus is of weight-saving construction; moreover, it is meant to be composed of structural components that can be dimensioned as a function of load, thus permitting easy adaptation to various load cases as in a modular system.

SUMMARY OF THE INVENTION

This object is achieved according to the invention by the fact that one or more driving pins each have at least one end received and fastened in housing holes, which are each formed half in the carrier shell and the cover shell, and by the fact that the two sheet metal shells are encompassed by one or more circumferential rings adjacent to the joint plane thereof for reinforcement thereof.

Within the meaning of the desired lightweight construction, the sheet metal shells are made preferably of high-strength steel materials with good deformability. The sheet metal thicknesses of the finished sheet metal shells are preferably between only 2 and 5 mm, depending on the size of the differential housing, measured at the inside diameter of its spherical shape.

For attachment of the wheel axles, the sheet metal shells of the differential housing, manufactured preferably by sheet metal forming, each have an outwardly protruding bearing hub, which is formed coaxially with the large diameter of the respective sheet metal shell adjoining the separating plane, or is joined as a separately manufactured hub bush to the sheet metal shell. The thickness of this sheet metal shell expediently decreases steadily and slightly from the hub root to the joint plane.

On the outsides of the sheet metal shells, adjacent to the joint plane, there are formed cylindrical faces as seating faces, which bear against corresponding inner seating faces of the circumferential rings. One or two circumferential rings is or are preferred, either in the form of a one-piece circumferential ring bridging over the common separating plane of the sheet metal shells or in the form of two circumferential rings adjacent to the separating plane, in which case each circumferential ring is joined to only one sheet metal shell.

In the one-piece embodiment, the ring thickness may decrease from the cover shell to the carrier shell. In the two-piece embodiment, the thicknesses of the circumferential rings may be different, and the ring with the stiffer cross section is preferably seated on the cover shell.

The circumferential rings have seating holes aligned with the housing holes to receive the driving pins, so that the ends thereof are received not only in the housing holes formed by the two sheet metal shells, but are braced in seating holes of the circumferential rings aligned therewith.

The circumferential rings ensure special stiffening of the differential housing in the region of the common separating plane, and so the sheet metal shells themselves can have a relatively small sheet metal thickness.

In order to obviate the need for chip-removing machining of the sheet metal shells in the region of the joint with the circumferential rings, it is sufficient to divide the circumferential rings into at least two ring halves in axial direction. Thereby the ring halves can be made to conform accurately to the shell contour during welding.

In the case that two separate circumferential rings are used, a firm interconnection of the components forming the differential housing is obtained by the fact that the circumferential rings are welded in the joint plane and additionally along their outside rims to the outsides of the sheet metal shells. In the case of a single circumferential ring, two welds along its outside rings are needed. Moreover, in the case of a single driving pin, at least one of the ends of the driving pin is welded along the circumference of its end face to one or more of the circumferential rings. In this way the driving pins ensure torque transmission from the drive gear via the differential housing to the axle bevel gears and thus to the wheel axles of the motor vehicle. A bevel-toothed ring gear is usually used as a drive gear; spur-toothed drive gears are also suitable.

According to a further configuration of the invention, it is provided that the toothed disk of the drive gear is welded at least along two circumferential edges of its inner circumferential face to the carrier shell and/or to a circumferential ring. Advantageously, this inner circumferential face of the toothed disk is formed in such a way that it corresponds substantially to the outer contour of the carrier shell to which the drive gear is fastened. The inner contour of the toothed disk may also be formed in such a way that it also or only bears on one circumferential ring and is welded thereto. Thus it can be adapted more easily to different structural sizes.

According to a further advantageous configuration of the invention, hub rings are provided for stiffening of the bearing hubs for attaching the wheel axles to the sheet metal shells. On the outside of each of the bearing hubs there is fastened a respective hub ring in the region of the hub root. Together with the sheet metal shell, each hub ring preferably forms a common bracing face and is welded thereto along two circumferential edges. The hub rings reinforce the differential housing in the region of the bearing hubs, and so a particularly stiff construction of the sheet metal shell itself can be avoided, especially in the transition region of sheet metal shell and bearing hub. At the same time, the hub rings offer axial bracing faces for rolling bearings seated on the bearing hub, for example as pre-loaded angular ball bearings.

Such hub rings may be omitted by the fact that, for attachment of the wheel axles, each sheet metal shell is joined to a hub bush, on which there is formed an outwardly protruding bearing seat, to which there is attached a joining ring adapted to the shape of the sheet metal shell. In this way notch stresses in the zone of the fit between the hub rings and sheet metal shells can be largely avoided.

To reduce the weight and also to create oil drainage, the differential housing can be provided with one or more openings in the region of the carrier shell and of the cover shell.

During mounting of the differential housing, the procedure is advantageously such that the complete gear assembly of differential bevel gears and axle bevel gears is inserted into an open sheet metal shell, either the carrier shell or the cover shell, after which the other sheet metal shell is mounted and the two sheet metal shells are welded to one another along one or more circumferential edges of the circumferential rings. Only then is the drive gear welded to the carrier shell.

Within the scope of the invention, it is possible to construct the two sheet metal shells identically, one to serve as the cover shell and the other as the carrier shell, thus leading to a considerable manufacturing simplification compared with known embodiments of differential housings.

Particularly expedient is an embodiment having only one driving pin passing through diagonally, on which pin the differential gears are supported. The rotation of the differential housing is transmitted via the driving pin, which is advantageously configured as a hollow pin, to the wheel axles. By the fact that the axle bevel gears of the wheel axles and the differential bevel gears can mesh with one another, the desired equalization of different speeds of rotation of the two wheel axles is achieved without torque interruption. In order to ensure smooth running of the bevel gear mechanism, it is desirable to make the reaction forces exerted on the mechanism assembly align in such a way that their resultant runs in the direction of the generating line of the reference cone, meaning that displacement forces on the bevel-gear mechanism run radially in the direction of the center of the toothing. Thereby problem-free engagement conditions of the bevel gear mechanism are ensured. For the purpose of influencing the direction of the reaction forces in the cited sense, it is possible to adapt the dimensions of the circumferential rings to the respective conditions, without the need to change the configuration of the sheet metal shells forming the differential housing. In this way the desired geometric optimization on the sides of the carrier shell and cover shell of the differential housing can be maintained, for example as regards sheet metal thickness and tapering thereof. For given axial forces in the direction of the drive axles, the action of force on the axial housing can be influenced by the fact that the stiffness of the differential housing can be adjusted by suitable dimensioning of the circumferential rings.

BRIEF DESCRIPTION OF THE DRAWINGS

An exemplary embodiment of the invention will be explained hereinafter on the basis of the drawing, wherein.

DETAILED DESCRIPTION OF THE INVENTION

Figure 1:
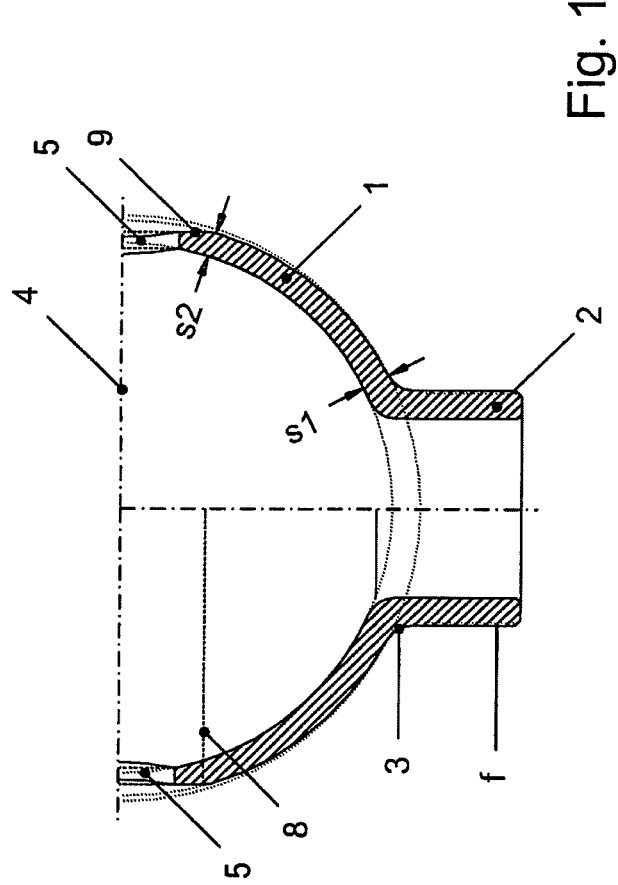
FIG. 1 shows an axial section through the carrier shell.

FIG. 1 shows an axial section through carrier shell 1 of a differential housing of a differential, or in other words a half section passing through the wheel axle. Carrier shell 1 is usually manufactured by deep drawing or a corresponding sheet metal forming process. It has a bearing hub 2, whose bearing seat f is machined to receive an axial bearing. It will be recognized that the wall thickness of the carrier shell decreases steadily in a manner dependent on the torque to be transmitted from hub root 3 to joint plane 4 with its cover shell (not illustrated), in the present example approximately from 4 mm at S1 to 3 mm at S2. Toward separating plane 4, semicircular bracing faces 5 are machined into carrier shell 1 to receive the ends of a driving pin (not illustrated), which passes diagonally through the differential housing in the region of separating plane 4 and on which the differential bevel gears are seated.

Figure 2:
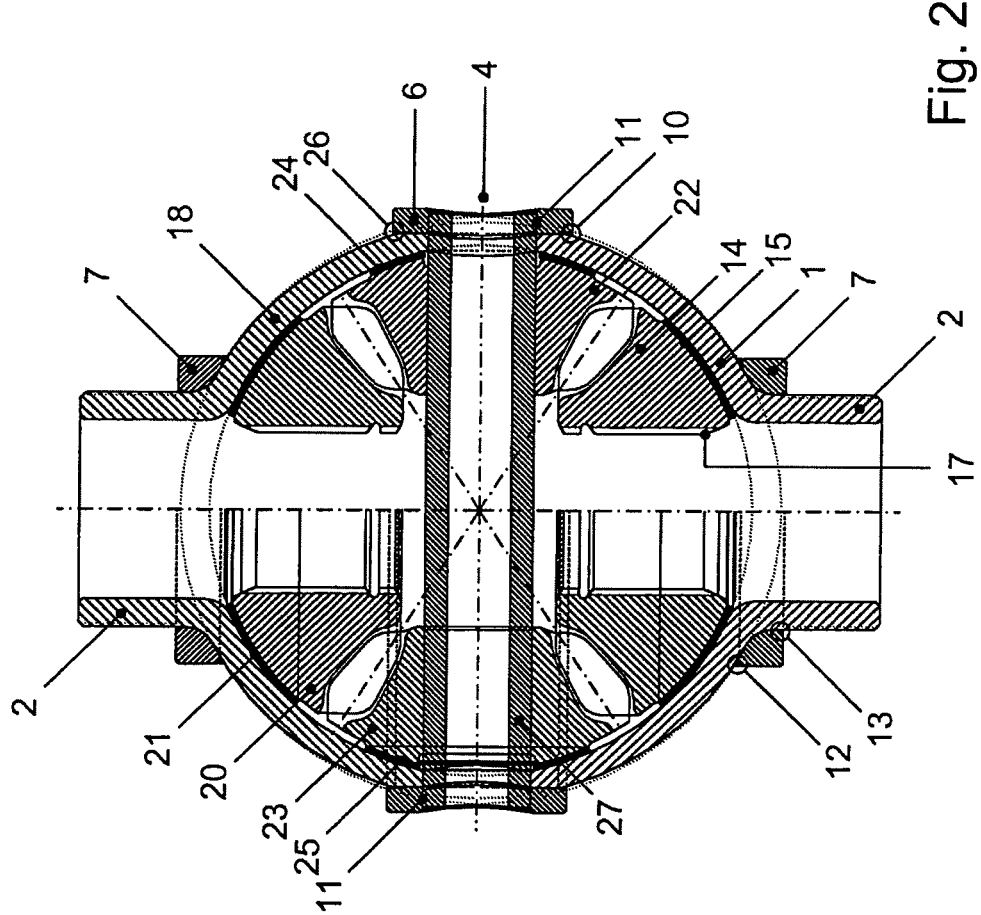
FIG. 2 shows an axial section through the differential housing after the carrier shell and cover shell have been fitted together, with one-piece circumferential ring.

FIG. 2 shows the complete differential housing, meaning that cover shell 18 is placed in such a way on carrier shell 1 that the two sheet metal shells lie one on the other in their entire joint plane 4. A circumferential ring 6 and a hub ring 7 are fastened on carrier shell 1. As is evident in FIG. 1, carrier shell 1 is turned down, on its outer face above dotted line 8, to a cylindrical face 9, which serves as a seating face for circumferential ring 6. At its lower rim, circumferential ring 6 is welded along weld 10 to the outside of carrier shell 1. Circumferential ring 6 has diagonally opposite holes 11, which are aligned exactly with seating faces 5 of carrier shell 1. Holes 11 and seating faces 5 serve to brace the opposite ends of the already mentioned driving pin 27. The two sheet metal shells are firmly joined to one another by the fact that the upper rim of circumferential ring 6 is welded along a circumferential weld 26 to cover shell 18. In this way the differential housing is assembled in finished condition. It still has to be attached to the wheel axles (not illustrated) and will then be mounted inside an outer housing (not illustrated) of the differential.

Whereas circumferential ring 6 acts to stiffen the sheet metal shells forming the differential housing in the region of separating plane 4, hub rings 7 bring about corresponding stiffening in the region of hub root 3 of the two sheet metal shells. On their side facing carrier shell 1, hub rings 7 have a contour corresponding to the surface of the sheet metal shells, and so they bear on the outside thereof. They are firmly joined to the associated sheet metal shell, respectively along a weld 12 at their inner edge and along a further weld 13 at their outer edge. Hub rings 7 may each be manufactured as prefabricated rings; they may also be manufactured as endless strip, wound around the sheet metal shell at the indicated position and then welded in place.

An axle bevel gear 14 is inserted into carrier shell 1, and a bracing shell 15 is interposed between axle bevel gear 14 and the inside wall of carrier shell 1. The bevel-gear toothing of axle bevel gear 14 meshes with the two differential bevel gears 22, 23, which are supported on driving pin 27. The hole of axle bevel gear 14 has a notched toothing 17 for transmission of torque to the wheel axle. An axle bevel gear 20 is disposed on a bracing shell 21 in cover shell 18.

Figure 3:
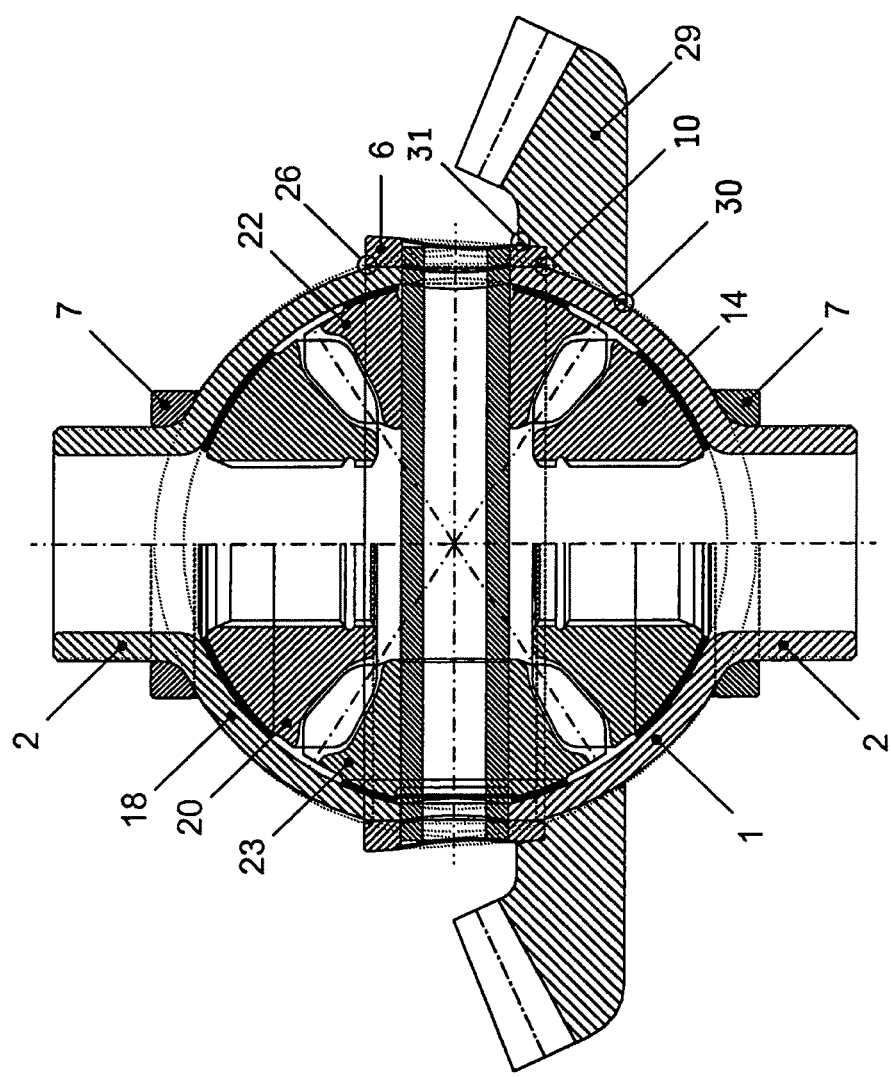
FIG. 3 shows a section according to FIG. 2, but with conical circumferential ring, after a drive ring gear in the form of a toothed crown has been fastened.

FIG. 3 shows the mounting of drive gear 29, which bears on the outside of carrier shell 1 with part of its inner contour, encompasses the lower rim of circumferential ring 6 with a recessed portion and is fastened on the one hand to the circumferential ring along circumferential weld 31 and on the other hand to carrier shell 1 along circumferential weld 30. Drive gear 29 is formed as a ring gear. It transmits the drive torque via carrier shell 1 to the differential housing, which rotates in a manner corresponding to the speed of rotation of the drive. A one-piece circumferential ring 6 has conical cross section, and its thicker end encompasses cover shell 18, with which it is welded along weld 26.

Figure 4:
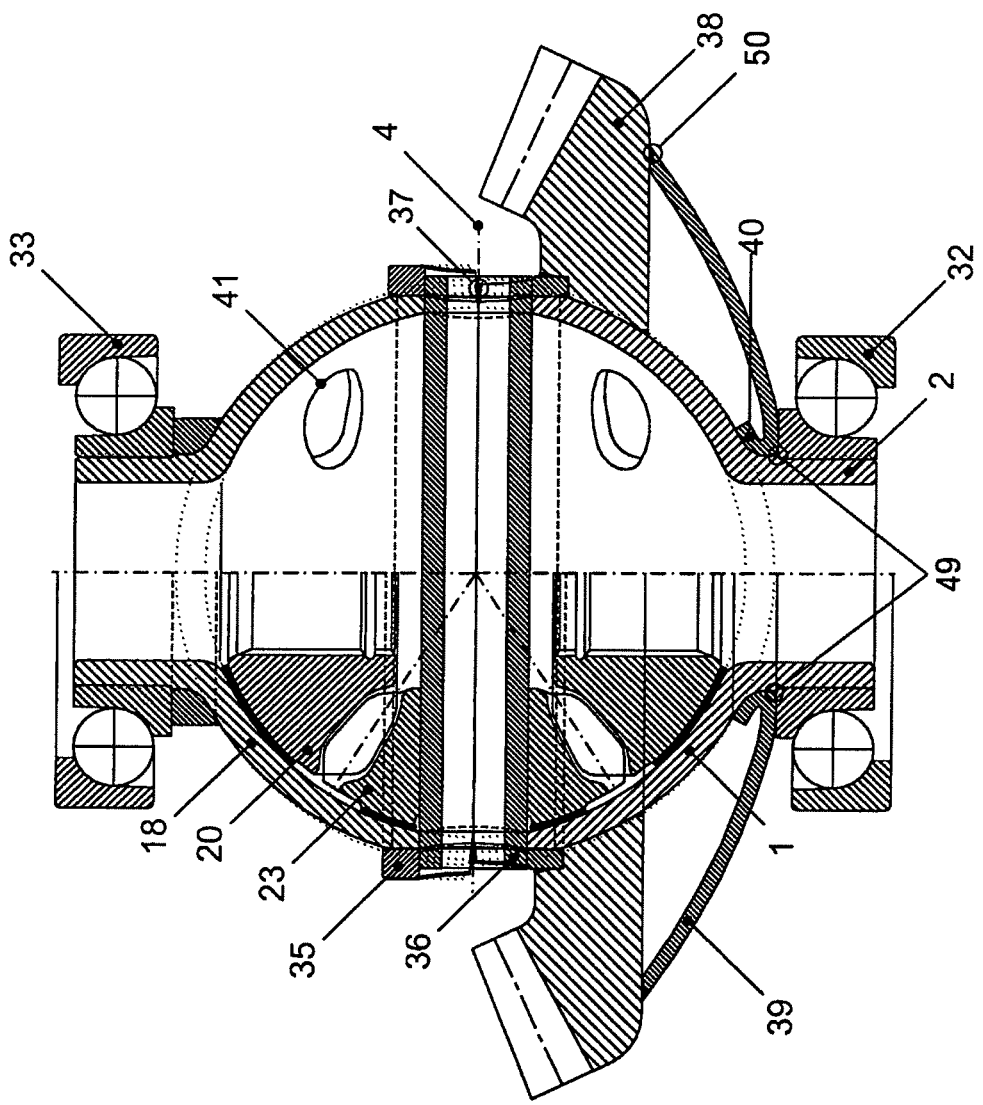
FIG. 4 shows a sectional drawing according to FIG. 3, but with two circumferential rings, after the axial bearing has been mounted on the bearing hub, and with a seating shell for the drive ring gear.

FIG. 4 shows an axial half section through a complete differential housing similar to that of FIG. 3. As an addition to FIG. 3, axial ball bearings 32, 33 are also mounted on bearing hubs 2 in FIG. 4.

In the embodiment according to FIG. 4 there is provided a split circumferential ring, meaning that it is made of an upper circumferential ring 35 of greater thickness around cover shell 18 and a lower circumferential ring 36 of smaller thickness around carrier shell 1. The two circumferential rings 35, 26 are welded to one another in joint plane 4 along a circumferential weld 37.

In the case of the embodiment according to FIG. 4, the drive gear is formed as bevel gear 38, and its inside contour is welded at the top to lower circumferential ring 36 and at the bottom to carrier shell 1. This variant of drive gear 38 is more useful as a structural component, since it can be integrated more easily into a modular system.

For additional bracing of drive gear 38, there is fastened to its underside, by welding along weld 50, a bracing shell 39, whose upwardly bent inner rim 40 is braced on the top side of adjacent axial bearing 32, in the region of the hub root of carrier shell 1. The joint to carrier shell 1 is made along weld 49.

In both sheet metal shells there are provided openings 41, which serve to reduce the weight and are also suitable for oil drainage.

Figure 5:
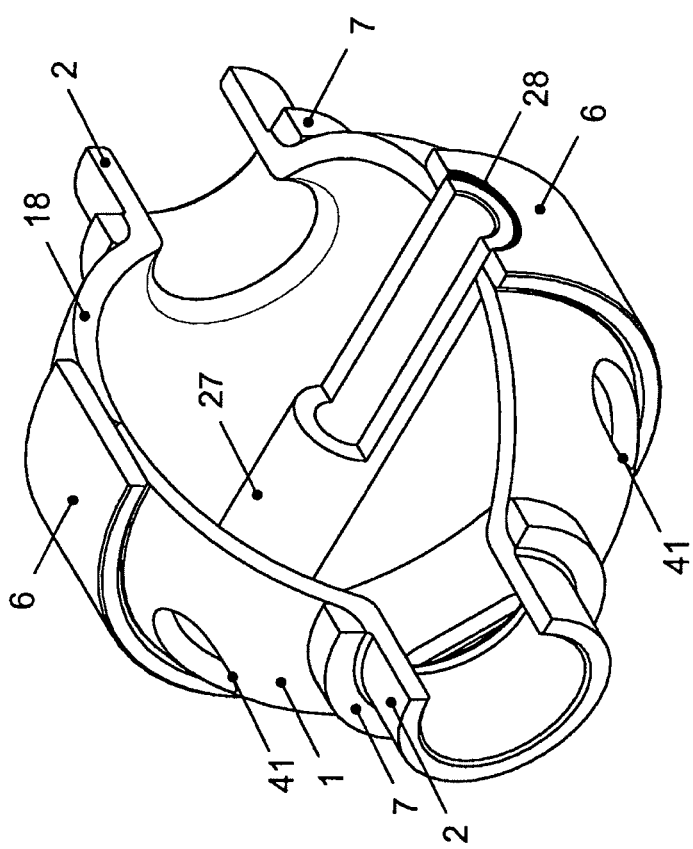
FIG. 5 shows a perspective view of the components of a differential housing fitted together according to FIG. 2 with cut-out 90° sector, without gears.

FIG. 5 shows a three-dimensional representation of the differential housing, from which a 90° sector has been cut out to illustrate the interior view without bevel gears. In this interior view there will also be recognized a correspondingly cut-out driving pin 27, which for weight reasons is formed as a cylindrical tube. In order to save costs, such driving pins are also manufactured from solid material. At the circumference of its end faces, driving pin 27 is welded along a circumferential weld 28 to both sheet metal shells.

Figure 6:
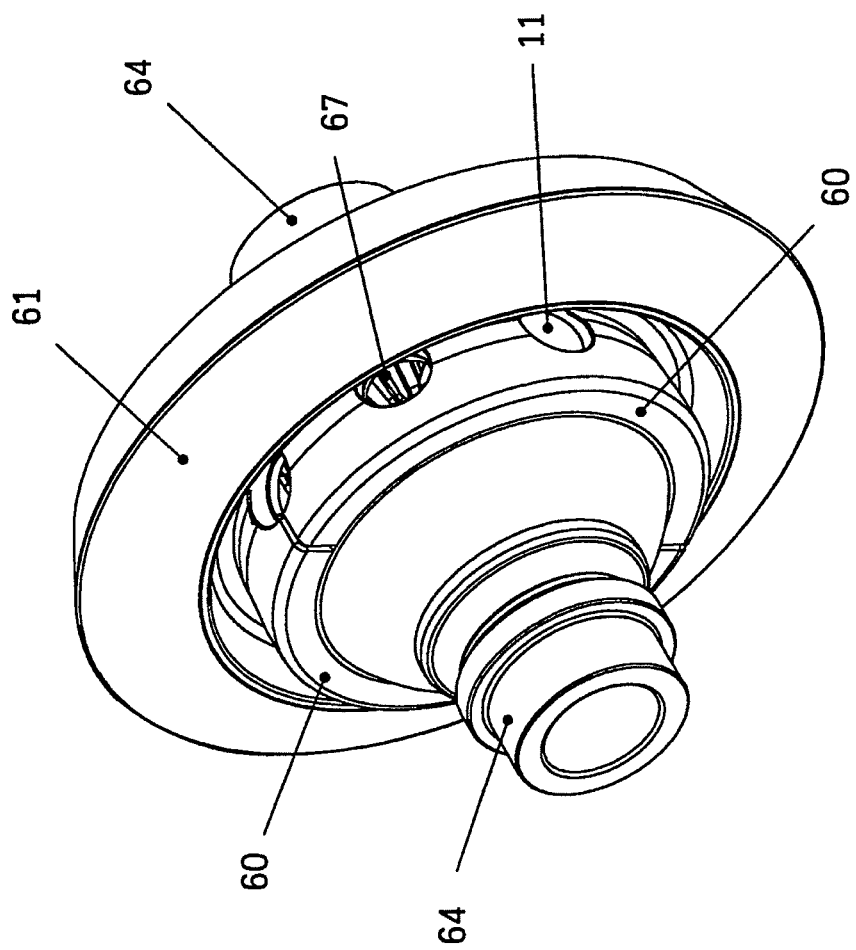
FIG. 6 shows a view of another embodiment of the differential housing.
Figure 7:
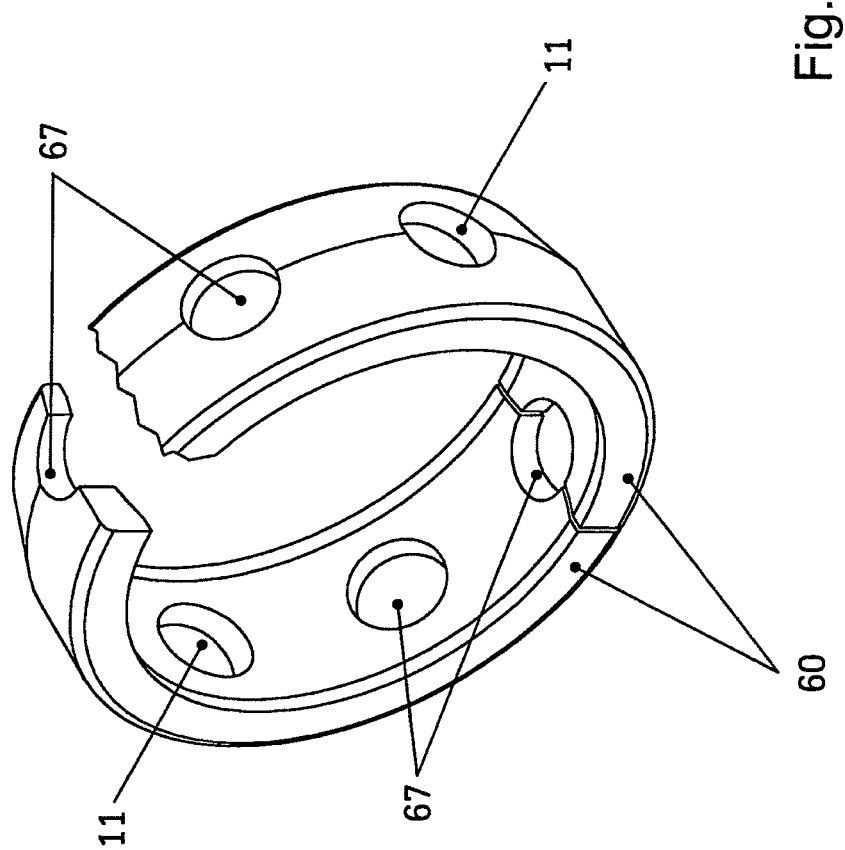
FIG. 7 shows a circumferential ring split in half in axial direction.

FIGS. 6 to 10 show another exemplary embodiment of a differential housing. This differs from the exemplary embodiments described in the foregoing by the fact in particular that there is provided a circumferential ring 60 split in half in axial direction; as shown in FIG. 7, it comprises two equal halves. As already shown for circumferential rings 35, 36 split in circumferential direction according to FIG. 4, circumferential ring 60 split in axial direction has asymmetric shape in axial section; specifically it is thicker in the region of its face in contact with cover shell 62 of the differential housing, and its thickness decreases progressively toward carrier shell 63, since there drive gear 61 provides the additional stiffening of carrier shell 63.

Figure 10:
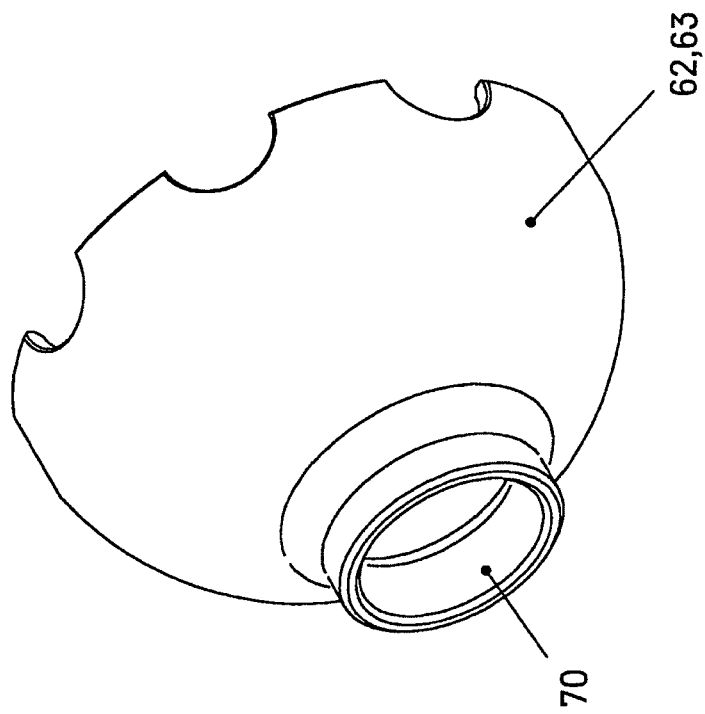
FIG. 10 shows a sheet metal shell of the differential housing in elevation.

According to FIGS. 6 and 7, split circumferential ring 60 has, next to oppositely disposed seating holes 11 for fastening driving pin or pins 27, further oil drainage holes 67 for the transmission oil, which holes are distributed over the circumference and are provided at positions coinciding with seating holes 11 in the sheet metal shells of the differential housing (FIG. 10).

Figure 8:
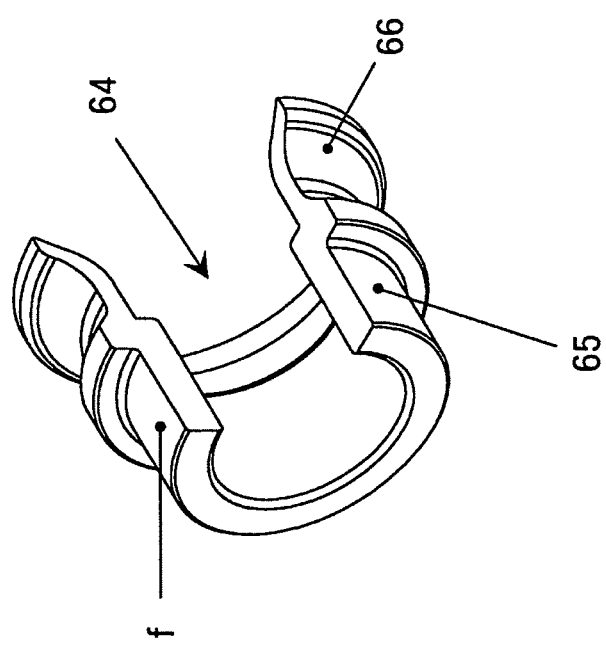
FIG. 8 shows a hub bush in cut-open representation.

For attachment of the wheel axles, each sheet metal shell 62, 63 is joined respectively to a hub bush 64, which is separately illustrated in FIG. 8. In its sectional diagram there will be recognized the actual bearing seat 65 for the wheel axle. At least the outer circumferential face f of bearing seat 65 is precision-machined to receive an axial bearing. Next to bearing seat 65, for the purpose of establishing the fitted joint with the sheet metal shell received therein, there is disposed a joint ring 66, whose inner contour is curved radially outward to adapt to the shape of the sheet metal shell and whose thickness viewed in axial direction decreases progressively with distance from the bearing seat. By suitable dimensioning of joint ring 66, it is possible to reduce the notch stress appropriately in the zone of the fit with the sheet metal shells.

Figure 9:
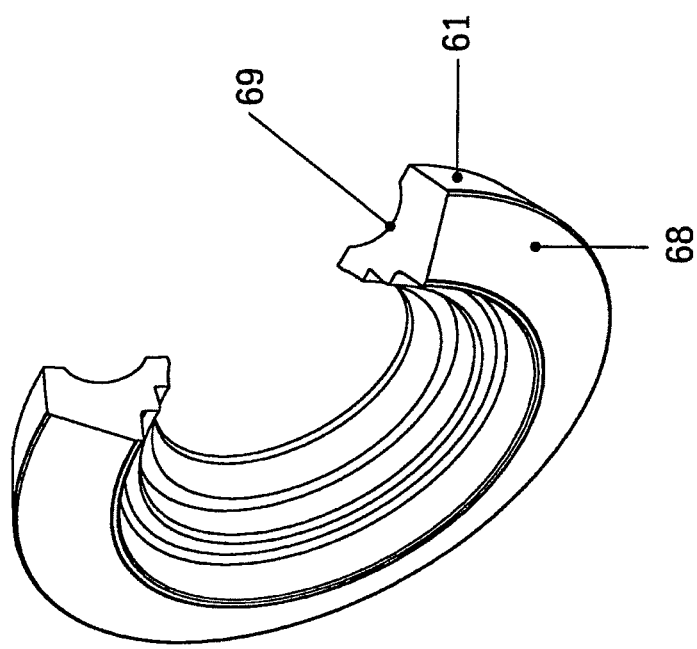
FIG. 9 shows a drive gear in cut-open representation.

On its face 68 turned toward cover shell 62, drive gear 61, illustrated in cut-open form in FIG. 9, has a spur-gear toothing or a bevel-gear toothing, which is not shown diagramatically in more detail in FIG. 9. For the purpose of weight reduction, radial face 69 opposite the toothing describes a groove-like indentation, which is formed appropriately to avoid deformations due to load. On its inner circumference, drive gear 61 is profiled in such a way that it embraces the end face of circumferential ring 60 and also bears on carrier shell 63 in the manner of a fitted joint. Advantageously the drive gear is welded over its circumference both to carrier shell 63 and to split circumferential ring 60.

FIG. 10 shows one of the two sheet metal shells of the differential housing, which is composed of two identical sheet metal shells, namely cover shell 62 and carrier shell 63. Each sheet metal shell has a hub expansion 70 for the fitted joint with a hub bush 64, as well as semicircular recesses over its large circumference in order to form seating holes 11 and oil drainage holes 67.

Figure 11:
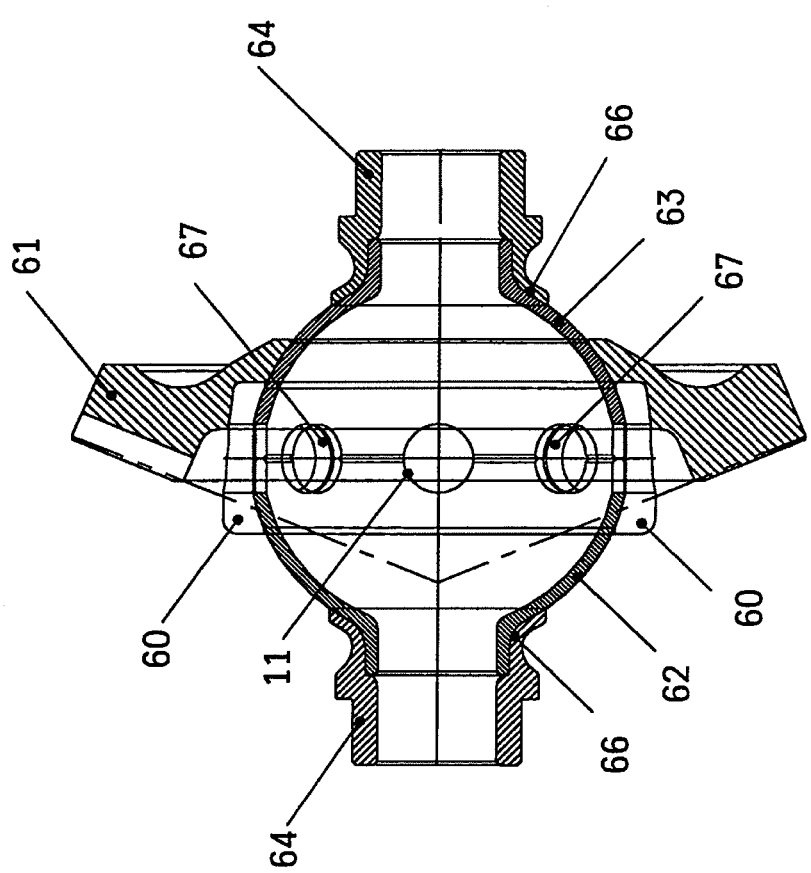
FIG. 11 shows an axial section through the differential housing.

FIG. 11 shows, in an axial section in elevation, how the individual components engage in one another, namely the assembly of hub bushes 64 (FIG. 8), cover shell 62 and carrier shell 63 (FIG. 10), circumferential ring 60 (FIG. 7) and drive gear 61 (FIG. 9). All components are tightly fitted into one another and welded to one another.

The invention claimed is:

1. A differential of lightweight construction for motor vehicles, the differential comprising:
a carrier shell and a cover shell, each shell made from sheet metal, each shell having a finished wall thickness of 2-5 mm,
the carrier shell and the cover shell fitted together along a common joint plane to form a differential housing, the carrier shell having an outer carrier shell surface to which a driving gear is fastened, the differential housing comprising a housing hole;

a driving pin and a plurality of bevel gears, the driving pin having a first end received and fastened in the housing hole, the plurality of bevel gears supported on the driving pin, each bevel gear of the plurality of bevel gears meshing with an axle bevel gear; and a circumferential ring adjacent to the joint plane for reinforcing the differential housing.

2. A differential according to claim 1, wherein the circumferential ring comprises a seating hole aligned with the housing hole.

3. A differential according to claim 2, wherein the circumferential ring comprising a single piece that bridges over the joint plane.

4. A differential according to claim 2, wherein the circumferential ring comprises at least two separate circumferential ring units that adjoin the joint plane.

5. A differential according to claim 2, wherein the circumferential ring is split in an axial direction into at least two ring halves.

6. A differential according to claim 2, wherein the cover shell comprises an outer cover shell surface, the outer cover shell surface and the outer carrier shell surface together comprising a cylindrical seating face, the circumferential ring comprises an inner seating face, the inner seating face bearing on the cylindrical seating face.

7. A differential according to claim 2,
wherein the cover shell comprises an outer cover shell surface,
wherein the circumferential ring is welded the outer cover shell surface and the outer carrier shell surface in the joint plane or along respective edges of the outer cover shell surface and the outer carrier shell surface.

8. A differential according to claim 1, further comprising the drive gear, the drive gear comprising a toothed disk,
wherein the toothed disk is welded to the outer carrier shell surface or is welded to the circumferential ring at least along two circumferential edges of an inner circumferential face.

9. A differential according to claim 1, wherein the cover shell and the carrier shell each comprise an outwardly protruding bearing hub for attaching wheel axles and a hub ring, the hub ring being welded to the respective cover shell or the carrier shell along two circumferential edges of the hub ring at a hub root of the bearing hub.

10. A differential according to claim 9, wherein the cover shell and the carrier shell each comprise a cross-sectional thickness that decreases steadily and slightly from the hub root to the joint plane.

11. A differential according to claim 1, further comprising a hub bush joined to the cover shell or the carrier shell, the hub bush for attaching a wheel axle, the hub bush comprising an outwardly protruding bearing seat to which there is attached a joining ring adapted to fit the respective cover shell or carrier shell.

12. A differential according to claim 1, wherein the driving pin passes diagonally through the differential housing and the first end is firmly joined along a circumference of an end face of the driving pin to the circumferential ring.

13. A differential according to claim 3, wherein the circumferential ring comprises trapezoidal cross-section and is welded at a thick end to the cover shell.

14. A differential according to claim 1, wherein the driving pin is hollow.

15. A differential of lightweight construction for motor vehicles, the differential comprising:
a carrier shell and a cover shell;
the carrier shell and the cover shell fitted together along a common joint plane to form a differential housing,
the carrier shell having an outer carrier shell surface to which a driving gear is fastened, the differential housing comprising a housing hole;
a driving pin and a plurality of bevel gears, the driving pin having a first end received and fastened in the housing hole, the plurality of bevel gears supported on the driving pin, each bevel gear of the plurality of bevel gears meshing with an axle bevel gear; and
a circumferential ring separate from the carrier shell and the cover shell, the ring adjacent to the joint plane for reinforcing the differential housing.

16. A differential of lightweight construction for motor vehicles, the differential comprising:
a first sheet metal shell and a second sheet metal shell, the two metal shells fitted together along a common joint plane to form a differential housing,
the first sheet metal shell having an outer carrier shell surface to which a driving gear is fastened, the differential housing comprising a housing hole;
a driving pin and a plurality of bevel gears, the driving pin having a first end received and fastened in the housing hole, the plurality of bevel gears supported on the driving pin, each bevel gear of the plurality of bevel gears meshing with an axle bevel gear; and
a circumferential ring separate from the two metal shells, the ring adjacent to the joint plane for reinforcing the differential housing.

\* \* \* \* \*